(12) United States Patent
Gruber et al.

(10) Patent No.: US 9,738,034 B2
(45) Date of Patent: Aug. 22, 2017

(54) DEVICE FOR PROCESSING PHOTO-POLYMERIZABLE MATERIAL FOR LAYER-BY-LAYER GENERATION OF A SHAPED BODY

(71) Applicants: Ivoclar Vivadent AG, Schaan (LI); Technische Universität Wien, Vienna (AT)

(72) Inventors: Simon Gruber, Vienna (AT); Jürgen Stampfl, Vienna (AT); Jörg Ebert, Buchs (CH)

(73) Assignees: Ivoclar Vivadent AG, Schaan (LI); Technische Universität Wien, Vienna (AT)

( * ) Notice: Subject to any disclaimer, the term of this patent is extended or adjusted under 35 U.S.C. 154(b) by 0 days.

(21) Appl. No.: 15/037,170

(22) PCT Filed: Nov. 19, 2014

(86) PCT No.: PCT/EP2014/075061
§ 371 (c)(1),
(2) Date: May 17, 2016

(87) PCT Pub. No.: WO2015/075094
PCT Pub. Date: May 28, 2015

(65) Prior Publication Data
US 2016/0279869 A1    Sep. 29, 2016

(30) Foreign Application Priority Data

Nov. 22, 2013 (EP) ..................... 13450050

(51) Int. Cl.
*B29C 35/00*      (2006.01)
*B29C 67/00*      (2017.01)
(Continued)

(52) U.S. Cl.
CPC ...... *B29C 67/0066* (2013.01); *B29C 67/0062* (2013.01); *B29C 67/0085* (2013.01);
(Continued)

(58) Field of Classification Search
CPC ............ B29C 67/0066; B29C 67/0062; B29C 67/0085; B29C 67/0088; B29C 67/0092
See application file for complete search history.

(56) References Cited

U.S. PATENT DOCUMENTS 5,137,662 A * 8/1992 Hull .................... B29C 67/0092
                                                        118/620
6,821,473 B2    11/2004 Hiizumi et al.
(Continued)

FOREIGN PATENT DOCUMENTS

DE    102006056422 B3    4/2008

*Primary Examiner* — Joseph S Del Sole
*Assistant Examiner* — John Robitaille
(74) *Attorney, Agent, or Firm* — Ann M. Knab; Thad McMurray

(57) ABSTRACT

A device for processing of highly viscous photopolymerizable material for layer-by-layer generation of a shaped body comprises a vat including a bottom which is at least in certain areas thereof transparent, a build platform, an exposure unit for exposing a material layer formed between the lower side of the build platform and the vat bottom in a locally selective manner, a control unit in order to adapt the relative position of the build platform to the vat bottom after each exposure step for a layer, in order to successively build up the shaped body in the desired shape, and a moveably guided doctor blade arrangement including a drive unit for moving the doctor blade arrangement back and forth underneath the build platform. The doctor blade arrangement comprises two doctor blades spaced apart in movement direction, which doctor blades are moveable at a constant distance to the vat bottom along the bottom. The vat includes vat end walls such that the doctor blade leading in movement (Continued)

direction in each case moves towards one of the vat end walls. Between the two doctor blades a chamber is formed which is open at its lower side, wherein walls of the chamber include at least one opening extending through the wall in movement direction for forming an overflow channel, so that material piling up between the leading doctor blade and the facing vat end wall is pressed through they at least overflow channel into the chamber.

15 Claims, 4 Drawing Sheets

(51) Int. Cl.
　　　B33Y 30/00　　　(2015.01)
　　　B33Y 50/02　　　(2015.01)
　　　B29K 27/18　　　(2006.01)
　　　B29K 59/00　　　(2006.01)

(52) U.S. Cl.
　　　CPC ...... *B29C 67/0088* (2013.01); *B29C 67/0092* (2013.01); *B29K 2027/18* (2013.01); *B29K 2059/00* (2013.01); *B33Y 30/00* (2014.12); *B33Y 50/02* (2014.12)

(56) References Cited

U.S. PATENT DOCUMENTS

| | | |
|---|---|---|
| 7,850,885 B2 | 12/2010 | Philippi et al. |
| 8,083,513 B2 | 12/2011 | Montero-Escuder et al. |
| 9,079,357 B2 | 7/2015 | Ebert et al. |
| 2013/0177767 A1* | 7/2013 | Grebe .................. B22F 3/003 428/411.1 |

* cited by examiner

DEVICE FOR PROCESSING PHOTO-POLYMERIZABLE MATERIAL FOR LAYER-BY-LAYER GENERATION OF A SHAPED BODY

CROSS-REFERENCE TO RELATED APPLICATIONS

This application is a National Stage application of International patent application PCT/EP2014/075061 filed on Nov. 19, 2014, which claims priority to European patent application No. 13450050.3 filed on Nov. 22, 2013, the disclosures of which are incorporated herein by reference in their entirety.

The invention relates to a device for processing photopolymerizable material for layer-by-layer generation of a shaped body, comprising a vat having a bottom which is at least in certain areas thereof transparent, into which vat photopolymerizable material can be filled, a build platform which is held at a settable height above the vat bottom, an exposure unit which can be controlled for exposure in a locally selective manner of a material layer formed between the lower surface of the build platform and the vat bottom, which exposure takes place from below through the vat bottom, a control unit which is arranged for polymerizing in successive exposure steps layers lying one above the other on the build platform, respectively with predetermined geometry by controlling the exposure unit, and which is arranged for adjusting, after each exposure step for a layer, the relative position of the build platform to the vat bottom in order in this way to build up the shaped body successively in the desired shape, and a moveably guided doctor blade arrangement including a drive unit for moving the doctor blade arrangement back and forth underneath the build platform.

Furthermore, the invention relates to a doctor blade arrangement for such a device.

A device of the above described kind is known from EP 2 505 341 A1.

Such a device permits lithography-based generative manufacturing of shaped bodies, in particular in the course of so-called rapid prototyping processes. In these stereolithography processes mentioned a newly supplied material layer is in each case polymerized with the desired contour, wherein by successively for each layer defining its individual contour the desired body is formed in its three-dimensional shape which is resulting from the succession of the layers made.

In a device of this kind in many cases instruments are utilized in order to turn the material in the vat or to redistribute it to guaranty a homogenous material layer. The instrument is for example a moveably mounted doctor blade including a drive unit for moving the doctor blade underneath the build platform forth and back. After lifting the build platform after an exposure step there is lack of material in the exposed area. This is due to the fact that after curing of the set layer of material the material from this layer has been cured and has been lifted up together with the build platform and the part of the shaped body already formed thereon. The photopolymerizable material which is lacking for this reason between the lower surfaces of the part of the shaped body already formed and the vat bottom has to be replenished from the infill of photopolymerizable material from neighboring areas surrounding the exposed area. Due to its high viscosity the material does not flow by itself into the exposed area between the lower side of the shaped body part and the vat bottom so that recesses of material or "holes" may remain here. The doctor blade serves the purpose to level the recesses in the material mentioned between the individual exposure steps. With current forms of doctor blades the distribution of material is not working in a reliable manner, in particular for material of high viscosity. In particular, the supply and transport is not performed fast enough and is subject to quantitative fluctuations.

The present invention aims at improving lithography-based generative manufacturing methods in such a manner that a consistent and rapid replenishment of unused photopolymer is ensured.

To achieve this object the invention essentially provides that in a device of the above-mentioned type the doctor blade arrangement includes two doctor blades spaced apart in movement direction, which doctor blades are moved in a constant distance to the vat bottom along the vat bottom. Preferably the arrangement here is such that the vertical distance of the doctor blades to the vat bottom may be adjusted by a simple adjustment device and that in this manner the layer thickness of the replenished material can be set. Preferably the two doctor blades are arranged at the same distance to the vat bottom. The doctor blades are preferably connected to a driving unit which drives the doctor blades to move back and forth. The arrangement with two doctor blades permits to form a material layer in both movement directions which allows to reduce the processing time substantially. In devices with conventional doctor blade arrangements the doctor blade or the wiper element had to be driven forth and back before a new layer could be formed.

The arrangement with two doctor blades offers furthermore the advantage that a chamber can be formed between the two preferably parallel doctor blades, which chamber serves as a reservoir for fresh material. During back or forth movement of the doctor blades during the distribution step the fresh material may flow downwards out of the chamber to refill possibly existing holes, empty spaces or recesses in the material layer, wherein the doctor blade trailing in movement direction defines the layer thickness. Holes, empty spaces or recesses of the bath level may result in particular in the area in which the build platform or already cured layers of the shaped body are lifted up out of the bath after the exposure step. Since the fresh slurry is mainly located in the chamber only relatively little material is needed for starting the build process and to maintain a reliable material replenishment.

In order to avoid that photopolymerizable material cools down in the area of the doctor blades, in particular the material located in the reservoir chamber between the two doctor blades, the doctor blades are in a preferred embodiment heatable. In particular the doctor blades can be equipped with at least one heating element, for example an electrical resistance heating element.

During back and forth movement of the doctor blade arrangement the leading doctor blade in movement direction pushes excess material ahead of it, until the doctor blade arrangement reaches the other end of the vat. There, excess material accumulates, which excess material has piled up in the form of a small wave between the leading doctor blade and the vat end wall, and tends to flow back either laterally besides the doctor blade arrangement or over the upper edge of the doctor blade arrangement. In order to utilize or to process the accumulating material, it is preferably arranged that at least one wall of the chamber has at least one opening extending through the wall in movement direction of the doctor blade arrangement for forming an overflow channel. By this means accumulated material can be pressed into the chamber formed between the doctor blades during or at the end of the distribution step. In this manner it is achieved that the material in the chamber is available for the next following distribution step. In addition, by squeezing the material and letting the material flow through the overflow channels the material is continuously mixed so that the risk of segregation, in particular for filled photopolymers, can be reduced substantially. Preferably in each of the two opposite walls of the chamber at least one opening is formed so that overflow of material is guaranteed in both movement directions of the doctor blade arrangement.

In order to allow sufficient replenishment of fresh photopolymer, if needed, the chamber is preferably provided with a re-filling opening at its top side, which opening leads to the chamber. During re-filling preferably a dosing unit is used.

Furthermore, the chamber which is open at its bottom may comprise at the narrow end faces extending between the two doctor blades at each end face an inflow opening such that also material accumulating close to the vat bottom at the doctor blade leading in movement direction can flow into the chamber.

Furthermore, at least a third doctor blade may be provided which is preferably arranged between the two doctor blades and which projects beyond the two doctor blades in the direction to the vat bottom. The third doctor blade is moved positioned such that unconsumed material is picked-up from the vat bottom. In this manner the unconsumed material is picked-up from the vat bottom upon each back and forth movement of the doctor blade arrangement and is conveyed into the chamber formed between the two doctor blades, in which chamber mixing and homogenization may take place.

To ensure that the third doctor blade does not have to be separately re-adjusted upon a change of height of the doctor blade arrangement, the third doctor blade is preferably arranged such that it is resiliently pressed on the vat bottom. This can be achieved by making the blade itself of elastic material or by mounting the blade to be displaceable against a bias force. In this manner it is achieved that the third doctor blade is in contact with the vat bottom independently of the height adjustment of the doctor blade arrangement. In case no solidification of thin applied layers is taking place, a comparable doctor blade construction may be realized in a preferred manner in a rotary vat.

It is particularly preferred that the doctor blade arrangement is integrally formed in one piece including the two outer doctor blades. The doctor blade arrangement preferably consists of a polymer material, for example polytetrafluorethylene or polyoxymethylene. In this manner the doctor blade arrangement can be arranged to be wear resistant and rigid. Due to the high wear resistance no significant abrasion occurs during operation so that the photopolymer is not contaminated. In addition, the materials mentioned for the doctor blade arrangement are easy to clean.

As already mentioned the present invention is also suitable for processing input materials of high viscosity. For example photopolymers which contain high-molecular monomer systems for plastification and corresponding enhancement of rigidity, show a particularly high viscosity. The following photopolymers/monomer systems can preferably be used with the invention:
mono and multifunctional acrylate
multifunctional methacrylate
various polyglycoles with a molecular mass between 200 and 1000 g/mol.

When processing filled photopolymerizable materials (slurries) one is also confronted with a high viscosity of the input material. In this case a sinterable material (for example a ceramic or metal) as a powder is added to a viscous, photosensitive resin. Upon curing of the individual layers the cured polymer acts as a binder. After the layered generation of the shaped body is completed the cured polymer is thermally removed and thereafter the remaining filler material (for example ceramic powder) is sintered to a rigid structure. Such processes allow to achieve all advantages of generative manufacturing also for materials which are as such not suitable for these processes. The filling level, i.e. the percentage of powder in the slurry, in this connection is one of the most important factors with respect to processability and material quality. In this connection it has turned out that in particular at a filling level between 42 and 65 vol % components of high quality can be generated. High filling levels are in most cases accompanied by a high viscosity of the input material which creates some problems, as for example high reaction forces, segregation of the slurries and aggravated material replenishment.

To lower the viscosity of the photopolymer it is preferred to provide a stationary heating device for heating up a layer of photopolymerizable material present in the vat to a temperature of at least 30° C. In this connection it is essential that the heating device is a device separate from the exposure unit. Preferably, the material is heated up to at least 40° C. The provision of the heating device is based on the fact that various photopolymers show a significant reduction of viscosity already upon a slight temperature increase. Generally, heating up to 50° C. is sufficient so that the additional power consumption is within acceptable limits. In special cases heating up to 80° C. may be necessary. At higher temperatures unintended thermal polymerization of the photopolymers takes place. Due to the heating also photopolymerizable materials can be utilized which show an increased intermolecular interaction. This increased intermolecular interaction shows up in an increased viscosity at room temperature (20° C.). The intermolecular interaction is in the present case in particular considered as sufficient if the starting material has a viscosity at room temperature of at least 20 Pa·s.

By virtue of the increased temperature in the processing zone the reactivity of the photopolymers is also increased. Compared to processing at room temperature a reduction of reactive groups is possible without adverse effects on the reactivity of the overall system.

Furthermore, it has been recognized that a satisfactory reduction of the viscosity to the extent that material distribution and layer formation is achieved without high expenditure of force and time, can be ensured in particular if the viscous material is preferably warmed up in extensive areas at the interface area (vat bottom) at which most of the reaction forces are caused.

The material is preferably heated in the processing zone of the device only. The processing zone comprises the area between the transparent vat bottom and the shaped body built so far. Typically a photopolymer layer of a thickness between 10 µm and 1.000 µm is heated. The remaining processing volume of the device in which the shaped body is located may be at a temperature which is below the temperature of the processing zone.

Preferably the heating device comprises at least one heating element disposed at or in the vat bottom, for example a heating foil. Thus, heat is transferred by the vat bottom so that an energy efficient heat transfer is ensured. A heating foil comprises a thin carrier element, for example made of plastics, in which heating wires are disposed in a meander pattern forming a resistance heater. The heating device, for example the heating foil, may be placed outside the transparent portion of the vat bottom. In particular two heating elements, for example heating foils, may be provided, wherein on each side of the transparent bottom subregion of the exposure area one element is disposed. In these lateral or marginal areas the doctor blade assembly is parked in a park position during the exposure step. This arrangement not only allows an undisturbed exposure but also a rapid heating of the fresh photopolymer, which material is located in the case of a doctor blade arrangement comprising two doctor blades primarily in the chamber between the two doctor blades.

Alternatively or in addition it can be provided for that the heating device extends at least partially over the transparent part of the bottom and is arranged to be transparent. In this case, however, the optical characteristics of the heating foil have to be observed carefully, in particular with respect to transparency and with respect to the fact that no coarse particles are enclosed.

A temperature control can be achieved in a simple manner by providing a temperature sensor which cooperates with the control unit for controlling the heating power of the heating device in such a manner that a given temperature of the photopolymerizable material is reached and/or is maintained. The temperature sensor can preferably be formed as a Pt temperature sensor and can be integrated in the heating foil.

The exposure unit can in principle be arranged in various manners, wherein the invention is not limited to use of visible light. Rather, any electromagnetic radiation is appropriate which is capable of curing the particular photopolymerizable material used. For example, UV light may be utilized. Alternatively light having a wavelength in the visible range can be used.

The exposure unit is preferably located below the vat bottom. The exposure unit is controlled by the control unit in order illuminate a predetermined exposure area on the lower surface of the vat bottom selectively in a pattern with a desired geometry. Preferably, the exposure unit comprises a light source having or more light emitting diodes, wherein in the exposure area preferably a light power from about 15 to 200 mW/cm$^2$ is reached. The wavelength of the light emitted by the exposure unit is preferably in the range from 350 to 500 nm. The light of the light source can be modulated in its intensity in a locally selective manner by a light modulator and the resulting intensity pattern having the desired geometry can be projected onto the lower surface of the vat bottom. As light modulators various kinds of so-called DLP-chips (digital light processing chips) may be used, for example micro mirror arrays, LCD-arrays and the like. Alternatively, a laser can be used as light source, wherein the laser beam successfully scans the exposure area via a moveable mirror which is controlled by the control unit.

Preferably the build platform is held by a lifting mechanism in a height adjustable manner above the vat bottom, wherein the lifting mechanism is controlled by the control unit. Preferably the control unit is arranged to set the thickness of the layer, i.e. the distance between the build platform or the last generated layer to the vat bottom, by means of the lifting mechanism.

The vat is preferably designed in two parts and comprises a, preferably multi-layer, transparent vat bottom and a vat framework. The lowest layer of the vat bottom consists for example of a massive glass plate which serves as a carrying or supporting element. On top of that a silicon layer and an anti-adhesive foil are disposed, which anti-adhesive foil serves to reduce the reaction forces when lifting up the last cured layer. The framework preferably consists of chemically stable plastic.

Advantageously the vat framework serves, besides its function as material container, the purpose of a clamping device for the vat system. This permits simple and fast change and replacement of vats. The two-part construction of the vat permits simple and fast cleaning after a building process.

Furthermore, a single vat body may be subdivided by partition walls into vat segments and may form a plurality of vats according to the invention.

The invention will be explained in more detail further below with reference to the embodiments shown in the drawings. In the drawings FIGS. 1 to 3 show schematical cross-sectional views of a device according to the invention in subsequent phases of the process;

Figure 1:
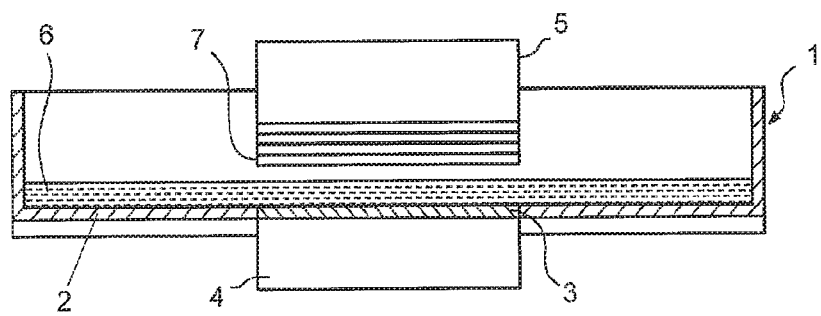

The operation of a device according to the invention will now first be described with reference to FIGS. 1 to 3, wherein in this respect reference is made to the device described in EP 2 505 341 A1. The device comprises a vat 1 having a vat bottom 2 which is, at least in a subregion 3 of its area, transparent or translucent. This subregion 3 of vat bottom 2 covers at least the extension of an exposure unit 4 which is located below the vat bottom 2. The exposure unit 4 comprises a light source and a light modulator by which, under control of a control unit, the intensity is set in a locally selective manner in order to generate an exposure area at the vat bottom 2 having the desired geometry for the current layer to be formed. Alternatively a laser may be used in the exposure unit 4, wherein the light beam of the laser scans, via a moveable mirror which is controlled by the control unit, the exposure area with the desired intensity pattern.

Opposite to exposure unit 4 and above vat 1 a build platform 5 is provided which is supported by a lifting mechanism (not shown) so that it is held in a height-adjustable way over the vat bottom 2 in the region above exposure unit 4. The build platform 5 may likewise be transparent or translucent in order that light can be irradiated by a further exposure unit above the build platform 5 in such a way that, at least when forming the first layer on the lower side of build platform 5, it can also be exposed from above so that the layer cured first on the build platform 5 adheres thereto with even greater reliability.

Vat 1 contains a filling of highly viscous photopolymerizable material 6. The material level of the filling is significantly higher than the thickness of the layers which are to be defined for exposure in a locally selective manner. In order to define a layer of photopolymerizable material, the following procedure is adopted. The build platform 5 is lowered by the lifting mechanism in a controlled way so that (before the first exposure step) its lower side is immersed in the filling of photopolymerizable material 6 to such an extent that precisely the desired layer thickness a (see FIG. 2) remains between the lower surface of the build platform 5 or the layer last formed thereon and the vat bottom 2.

During this immersion process, photopolymerizable material is displaced from the gap between the lower side of the build platform 5 and the vat bottom 2. After the layer thickness a has been set, the position-selective exposure desired for this layer is carried out for this layer, in order to cure it in the desired shape. Particularly when forming the first layer, exposure from above may also take place through the transparent or translucent build platform 5 so that reliable and complete curing takes place particularly in the contact region between the lower side of the build platform 5 and the photopolymerizable material, and therefore good adhesion of the first layer to the build platform 12 is ensured. After the layer has been formed, the build platform 5 is raised again by means of the lifting mechanism.

These steps are subsequently repeated several time, the distance from the lower side of the layer 7 formed last to the vat bottom 2 respectively being set to the desired layer thickness a, and the next layer is thereupon cured in the desired locally selective way.

Figure 3:
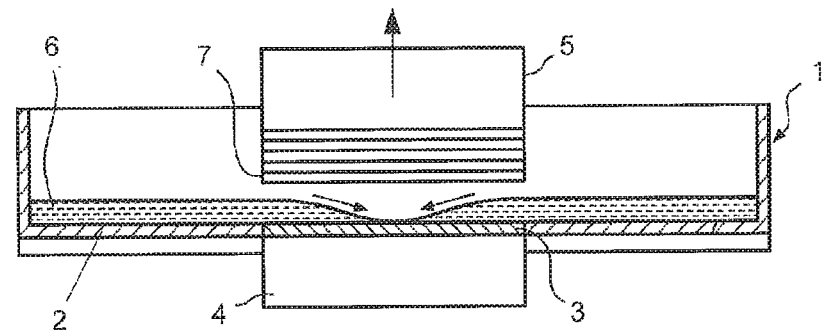

After the build platform 5 has been raised following an exposure step, there is a material deficit in the exposed region as indicated in FIG. 3. This is because after curing the layer set with the thickness a, the material of this layer is cured and raised with the build platform 5 and the part of the shaped body already formed thereon. The photopolymerizable material therefore missing between the lower side of the already formed shaped body part and the vat bottom 2 must be re-filled from the filling of photopolymerizable material 6 from the regions surrounding the exposed region. Owing to the high viscosity of the material, however, it does not flow by itself back into the exposed region between the lower side of the shaped body part and the vat bottom so that material recesses or "holes" can remain here.

Figure 2:
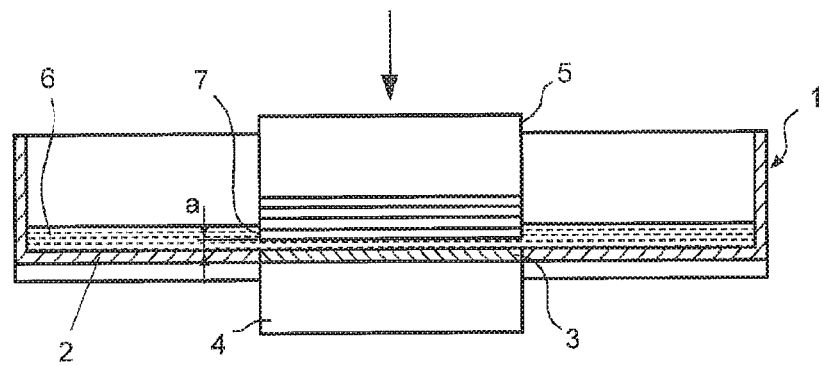
Figure 4:
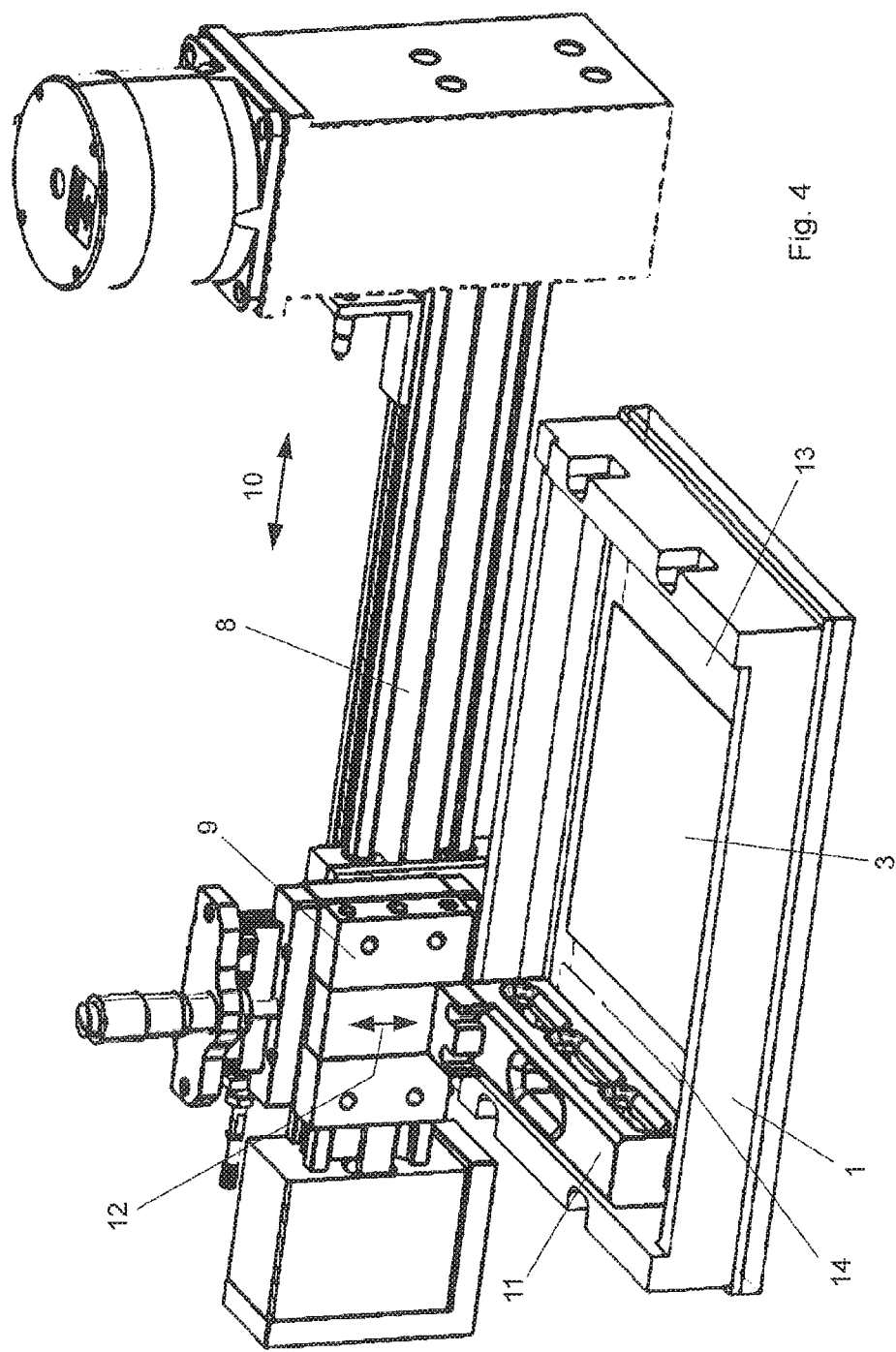
FIG. 4 shows a perspective view of the apparatus without build platform.

In the view of FIG. 4 components are shown which were omitted for better clarity in FIGS. 1 to 3. The vat is again designated with 1, its bottom including a transparent portion 3. The vat 1 is associated with a guide rail 8 on which a slide 9 is slidably supported to be moveable in the directions of the double arrow 10. A drive provides for back and forth movement of the slide 9 which comprises a mount for a doctor blade arrangement 11. The mount includes a guidance and adjusting device in order to adjust the doctor blade arrangement 11 in the direction of double arrow 12 in height direction. In this manner the distance of the lower edge of the doctor blade arrangement 11 to the bottom of vat 1 can be set. The doctor blade arrangement 11 is employed after the build platform has been raised as shown in FIG. 3, and serves the purpose to uniformly distribute the material 6 while setting a given layer thickness in order to balance the material deficit in the region of build platform 5 and to replenish new material if necessary. The layer thickness of the material 6 resulting from the material distribution step is defined by the distance of the lower edge of the doctor blade arrangement 11 to the bottom 2 of vat 1.

Furthermore, heating foils 13 and 14 are shown on both sides of the transparent portion 3 of vat bottom 2, which heating foils serve the purpose to warm up the material 6 in order to lower its viscosity.

Figure 5:
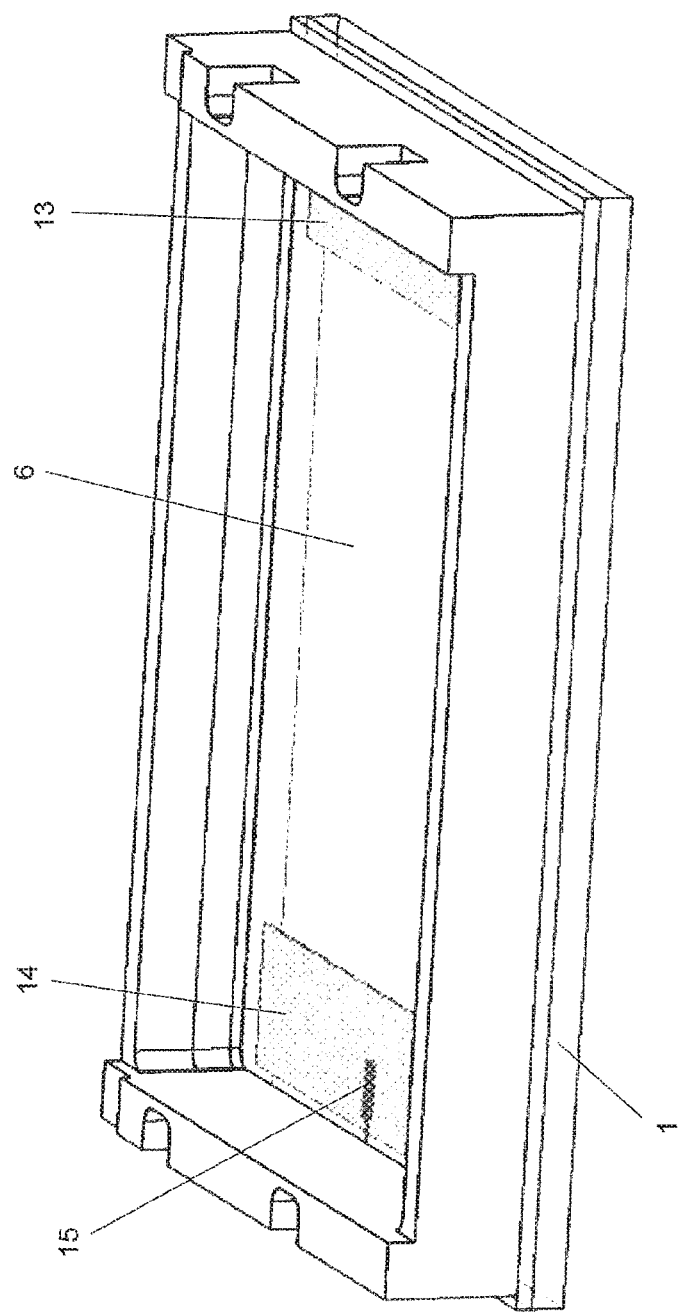
FIG. 5 shows a perspective view of the vat according to FIG. 4.

In FIG. 5 the heating foils 13 and 14 can be seen more clearly. Furthermore, a temperature sensor 15 is shown which is used to measure the temperature of the heating foil 14 and the material 6, respectively.

Figure 6:
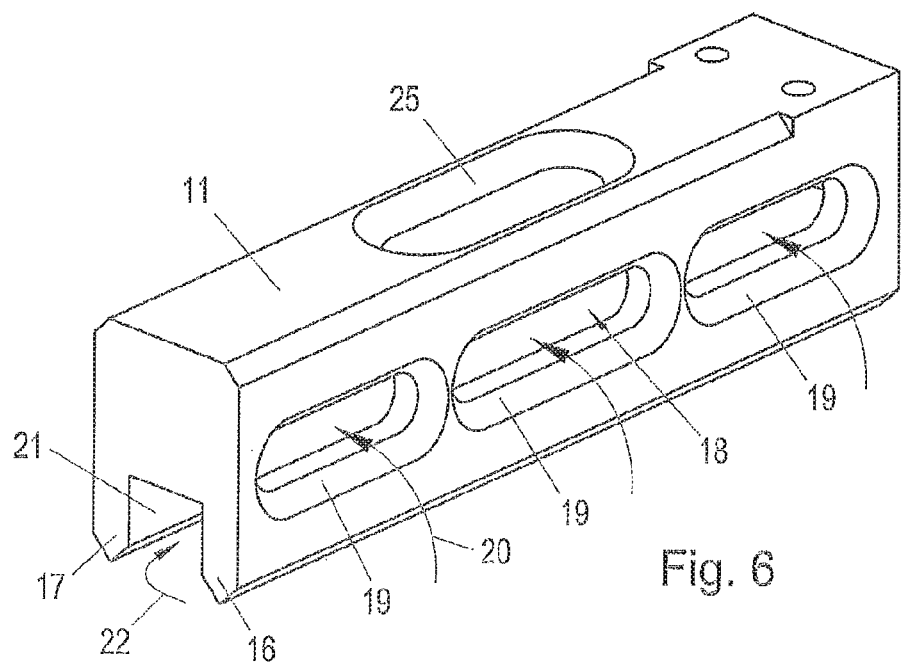
FIG. 6 shows a perspective view of the doctor blade arrangement utilized according to the invention.

In FIG. 6 the design of the doctor blade arrangement 11 is shown in more detail. The doctor blade arrangement comprises two parallel doctor blades 16 and 17 between which in the interior of the doctor blade arrangement 11 a chamber 18 is formed. On the long side of doctor blade arrangement 11 three overflow channels 19 are provided through which material 6 can flow into the chamber 18 as indicated by arrows 20. Corresponding overflow channels are also provided on the opposite long side of the doctor blade arrangement 11, which opposite overflow channels are not visible in FIG. 6. The chamber 18 is open on the narrow sides of the doctor blade arrangement 11 (openings 21) so that also here inflow of material 6 is possible as indicated by arrow 22. Through the top opening 25 new material can be filled into the chamber 18 if necessary.

The operation of the doctor blade arrangement 11 is now described with reference to the cross-sectional view of FIG. 7. When moving the doctor blade arrangement 11 in the direction of arrow 23 the lower edge of doctor blade 16 and 17, respectively, defines a material layer 26 with a given layer thickness. The doctor blades 16 and 17 are disposed at the same distance to bottom 3. Excess material 6 is pushed ahead by doctor blade 17 which is leading in movement direction which results in a flow movement corresponding to arrow 24. When the doctor blade arrangement 11 at the end of the cycle is moved closer against the inner end wall of vat 1, material accumulated or piled up ahead of doctor blade 17 is pressed through the overflow openings 19 into chamber 18. At the narrow sides the material can flow through the narrow side openings 21 into the chamber 18.

Figure 7:
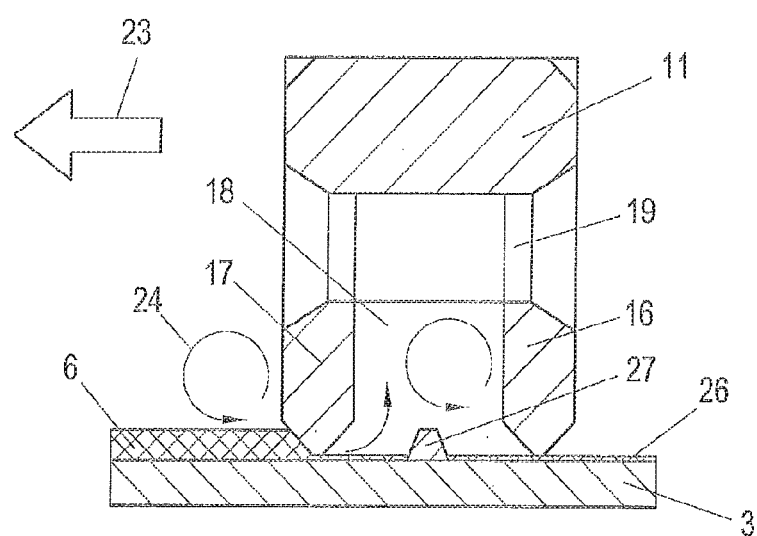
FIG. 7 shows a schematical cross-sectional view of the doctor blade arrangement according to FIG. 6.

Between the doctor blades 16 and 17 a third doctor blade 27 is arranged which is schematically indicated in FIG. 7 and which is located vertically below the doctor blades 16 and 17. The third doctor blade 27 touches the vat bottom 3 and picks up unconsumed material from the vat bottom. In this manner the unconsumed material is conveyed into the chamber 18 upon each back and forth movement, respectively, of the doctor blade arrangement 11, wherein in the chamber 18 mixing and homogenization of the material can take place.

Due to the fact that the doctor blade arrangement including the two doctor blades 16 and 17 and the chamber 18 is formed an essentially symmetrical manner one back or forth movement is sufficient in order to uniformly distribute material for the next exposure step. This is a significant advantage over conventional arrangements for which for this purpose back and forth movements are necessary.

The work which led to the present invention have been supported by the European union in the framework of the seventh program PHOCAM under support contract number 26043.

The invention claimed is:

1. Device for processing highly viscous photopolymerizable material for layer-by-layer generation of a shaped body comprising
    a vat having a bottom which is at least in a subregion thereof transparent, into which vat photopolymerizable material can be filled,
    a build platform which is held at an adjustable height over the vat bottom,
    an exposure unit controllable for exposing in a locally selective manner a material layer formed between a lower side of the build platform and the vat bottom, said exposing being from below through the vat bottom
    a control unit which is arranged to polymerize in subsequent exposure steps layers on top of each other on the build platform, in each case with a given geometry by controlling the exposure unit, and after each exposure step for a layer to adapt the relative position of the build platform with respect to the vat bottom, in order to hereby successively generate the shaped body in the desired shape, and a moveably guided doctor blade arrangement comprising a drive unit for back and forth movement of the doctor blade arrangement through beneath the build platform, characterized in that the doctor blade arrangement includes two doctor blades which are spaced apart in movement direction and which are moveable along the vat bottom at an adjustable distance to the vat bottom, the vat includes vat end walls so that the doctor blade leading in movement direction is moving towards one of the vat end walls, between the two doctor blades a chamber open at a lower side is formed, a wall of the chamber including at least one opening extending in movement direction of the doctor blade arrangement through the wall for forming an overflow channel such that material which is accumulating between the leading doctor blade and the vat end wall facing the leading doctor blade is pressed through the at least one overflow channel into the chamber.

2. Device according to claim 1, characterized in that the open chamber comprises between the two doctor blades an inflow opening.

3. Device according to claim 2, characterized in that the chamber comprises at its top side a re-fill opening.

4. Device according to any of claim 3, characterized in that at least a third doctor blade is provided which is disposed between the two doctor blades of the doctor blade arrangement and which projects beyond the two doctor blades in the direction towards the vat bottom.

5. Device according to claim 4, characterized in that the third doctor blade touches the vat bottom and is preferably held resiliently biased against the vat bottom.

6. Device according to claim 5, characterized in that the doctor blade arrangement is integrally formed in one piece including the two outer doctor blades and consists of a polymer material.

7. Device according to claim 6, characterized in that a stationary heating device is provided for warming up a layer of photopolymerizable material in the vat to a temperature of at least 30° C.

8. Device according to claim 7, characterized in that the heating device includes at least one heating element in or at the vat bottom.

9. Device according to claim 7, characterized in that the heating device is disposed outside of the transparent bottom subregion of the vat.

10. Device according to claim 9, characterized in that the heating device is extending at least partially over the transparent bottom portion of the vat and is arranged to be transparent.

11. Device according to claim 10, characterized in that a temperature sensor is provided which cooperates with the control unit for controlling the heating power of the heating device in such a manner that a given temperature of the photopolymerizable material is reached and/or maintained.

12. Device according to claim 11, characterized in that the doctor blade arrangement is heatable, equipped with at least one heating element.

13. Device according to any of claim 6, characterized in that the polymer material comprises poly-tetrafluoroethylene or polyoxymethylene.

14. Device according to claim 8, characterized in that the at least one heating element in or at the vat bottom comprises a heating foil.

15. Device according to claim 12, characterized in that the at least one heating element comprises an electrical resistance heating element.

* * * * *